United States Patent [19]

Zivley et al.

[11] Patent Number: 4,774,718

[45] Date of Patent: Sep. 27, 1988

[54] AUTOMATIC EJECTOR RATE NORMALIZER

[75] Inventors: George A. Zivley; Jay A. Rice, both of Houston, Tex.

[73] Assignee: ESM International Inc., Houston, Tex.

[21] Appl. No.: 77,382

[22] Filed: Jul. 24, 1987

[51] Int. Cl.[4] .......................... G06F 15/46; B07C 5/342

[52] U.S. Cl. .......................................... 377/2; 377/29; 250/214 AG; 250/226; 209/580

[58] Field of Search ............................... 377/2, 13, 29; 250/214 AG, 226; 209/580

[56] References Cited

U.S. PATENT DOCUMENTS

| | | | |
|---|---|---|---|
| 3,944,819 | 3/1976 | Sherwood | 250/226 |
| 4,097,731 | 6/1978 | Krause | 250/214 AG |
| 4,458,357 | 7/1984 | Weymouth et al. | 377/2 |
| 4,459,475 | 7/1984 | Flint et al. | 250/214 AG |
| 4,546,885 | 10/1985 | Satake | 209/580 |
| 4,626,677 | 12/1986 | Browne | 209/580 |
| 4,670,647 | 6/1987 | Hubble | 250/214 AG |
| 4,701,603 | 10/1987 | Dakin et al. | 250/214 AG |

*Primary Examiner*—John S. Heyman

*Attorney, Agent, or Firm*—Vaden, Eickenroht, Thompson & Boulware

[57] ABSTRACT

An iterative and continuous normalizer for ensuring that the ejector rate of the slave channels in a fungible product sorter are operating at the same rate as a channel selected as the master channel. A distributed trip level value applied to a master channel comparator results in a rate of ejection of non-standard products that are counted to a predetermined count, at which time a master channel counter output is produced. In similar fashion, a slave channel output is produced; however, the comparator in the slave channel operates to an adjusted trip level value, which is the distributed trip level value adjusted by a multiplying factor. This multiplying factor is produced by a multiplier controlled by an up/down counter, in turn controlled up or down by whether the slave channel counter output or master channel counter output arrives first. The multiplier makes the adjusted trip level value higher or lower to change the sensitivity of the slave channel to keep it operating at the same rate as the master channel operation.

6 Claims, 2 Drawing Sheets

AUTOMATIC EJECTOR RATE NORMALIZER

BACKGROUND OF THE INVENTION

1. Field of the Invention

This invention pertains to normalizing and more particularly to automatically normalizing to a master channel of a multi-channel sorting apparatus for processing relatively large quantities of fungible products and rejecting non-standard products.

2. Description of the Prior Art

A typical color food sorting machine consists of many different components in order to electronically discriminate unacceptable from acceptable food products and mechanically separate (i.e. sort) the bad from the good. These components are generally comprised of one or more lighting illumination sources; optical assemblies for viewing, focusing, and light wavelength filtering; photocell detectors for converting light energy into electricity; and various electronic circuits for amplifying, conditioning and classifying resultant signals into acceptable and unacceptable occurrences. For multiple channel sorting machines, multiple sets of these various components are packaged into one machine.

A description of one type of normalizing for such a machine is described in commonly assigned U.S. Pat. No. 4,626,677, "Continuous Normalizer for an Electronic Circuit that Compensates for External and Internal Drift Factors", Edward M. Browne, issued Dec. 2, 1986, which patent is incorporated herein by reference for all purposes. Although the circuit operation therein described is suitable for continuously normalizing and thereby stabilizing the operation of a single channel, it is very common to have multiple channels in a single machine that are each independently operating and normalizing only to what occurs in their respective channels.

In the ideal sorting machine, each of the various components are identically matched to each other and packaged with absolute precision that result in each channel's classification discrimination capability of identical good and bad products being exactly the same. Great effort and expense is devoted in the design, testing qualification, and manufacture of sorting machines to achieve this perfect assembly of matched components. However, practical machines are never made with perfect components. Each of the various machine components have inherent subtle variations in their performance parameters that result in each channel having similar, but never identical, classification discrimination capability.

Typical corrective techniques that have historically been used include potentiometer adjustment of signal gains and nulls, and electronic storage and comparison of signal characteristics to a set of known good signals. Although these techniques have greatly improved overall machine performance on initial adjustment, nothing stays the same for long.

Over a period of time, machine performance degrades due to aging of the lamps and electronic components, subtle shifts of product color and hue, differences in product batches and differences in product conveyance characteristics. To correct this degradation, the user must shut the machine down and have a human operator and/or technician readjust and/or calibrate the machine for desired performance. To prolong the period between readjustment and/or calibration, the continuous normalizer described in U.S. Pat. No. 4,626,677 was developed. However, the normalizer operation described in the '677 patent does not normalize to a single channel. Therefore, in a multi-channel machine, the readjustment and/or calibration requirements to prevent a wide disparity in rejection rate from developing from channel to channel still leads to costly downtime, lost production capacity, and high maintenance expense.

In the multi-channel machines currently in use, there is an adjustable potentiometer or the like for each channel that is included in the discrimination circuit. A human operator or technician observes the operation and if it appears to him that a particular channel is rejecting more or less of the products than the other channels, he trims or "tweeks" the adjustment on that channel to bring it back in line. To periodically make such fine tune adjustments in response to visually determining if the ejectors are firing at similar rates is extremely tedious and uncertain in result when there are a large number of channels. There are machines with up to 128 channels in use today.

A technique has recently been conceived to help achieve uniformity of detection among multiple channels. A single channel out of a group of similar channels is designated as the "master" or calibration channel. A single analog reference generates the discrimination or "trip level" reference signal, which is routed to all channels. However, because of the limitations of a number of factors such as light intensity or amplifier gain, the trip level for the non-master or "slave" channels is likely to be somewhat in error. That is, even though the trip level for a slave channel is exactly the same as for its master channel, the discrimination characteristics will likely be different.

Therefore, it is a feature of the present invention to provide an automatic ejector rate normalizer that assures that the ejector rate for each of the slave channels tracks the ejector rate for the master channel.

It is another feature of the present invention to provide an automatic ejector rate normalizer that includes a counter for the master channel ejector portion and assures that each of the slave channels is automatically adjusted to continuously eject "bad" products at the same rate by count as the master channel ejector.

It is still another feature of the present invention to provide automatic detection sensitivity correction to channel ejection circuitry as determined by digital correction from the master channel of the analog trip level signal respectively supplied to each slave channel.

SUMMARY OF THE INVENTION

An optical or other detector is positioned to detect non-standard products in the master channel of a fungible product sorter and following signal amplification applies a voltage level to one input of the master channel comparator. The other input to this comparator is from a fixed voltage level that is derived from a potentiometer setting. This level is referred to herein as the distributed trip level value. The output of the master channel comparator is applied to the master channel output pulse network, which produces a pulse each time a non-standard (usually signifying a defective) product is detected.

The output of the output pulse network is connected to the master channel counter that produces an output each time a predetermined number of counts has been applied thereto. Typically, this is when the count reaches 128.

Each slave channel is similarly equipped with a slave channel detector, a comparator, an output pulse network and a counter. However, a connection is made to the output of the master channel counter, which has just been described, through a buss line connecting the master channel and all slave channels. The connection to each slave channel is to an up/down counter and the output of the slave channel counter is also applied to the up/down counter. A multiplier including a digital-to-analog converter is connected to the output of the up/down counter, the multiplier being adjusted each time there is an output from the master channel counter. When the slave channel counter output arrives first there is an incremental multiplier increase of the distributed trip level value to produce an increased "adjusted" trip level value to the slave channel comparator. This effectively reduces the sensitivity of the slave channel so that it will reject fewer non-standard products and bring it closer in sensitivity compared with the master channel sensitivity. A master channel counter output arriving first at the up/down counter causes an incremental multiplier decrease and an increase of sensitivity for the slave channel. Hence, each slave channel is continuously adjusted or corrected to track master channel operation.

BRIEF DESCRIPTION OF THE DRAWINGS

So that the manner in which the above recited features, advantages and objects of the invention, as well as others which will become apparent, are attained and can be understood in detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

In the drawings.

DESCRIPTION OF THE PREFERRED EMBODIMENT

Figure 1:
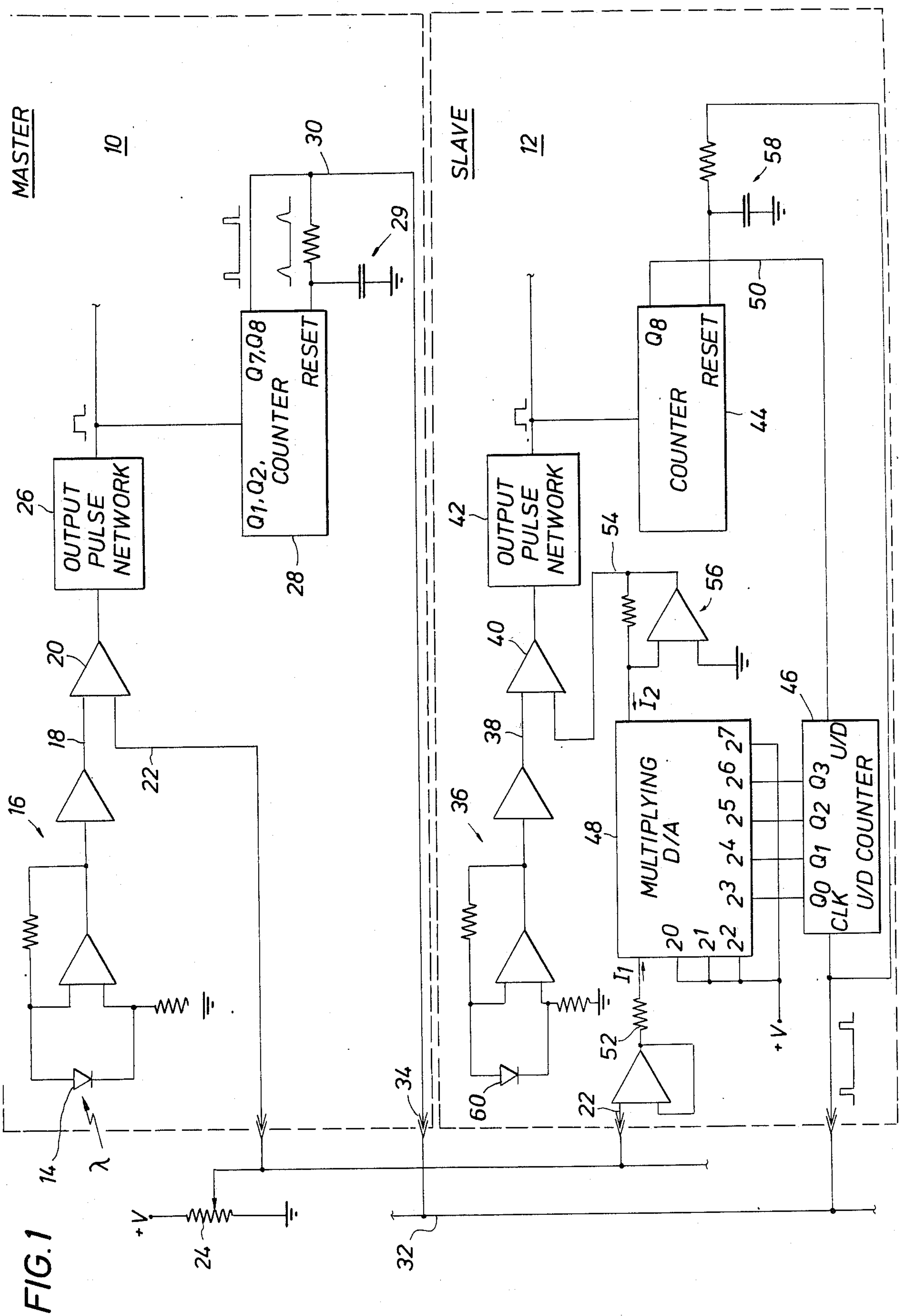
FIG. 1 is a simplified block diagram of a preferred embodiment of a master channel and one of the slave channels of a sorter incorporating the present invention.

Now referring to the drawings, and first to FIG. 1, a simplified block diagram of an automatic ejector rate normalizer in accordance with the present invention is illustrated. Shown in the block diagram is the normalizing circuitry necessary for the invention included in master channel 10 and in one of the slave channels 12. It is understood that a sorter will not be limited to a single slave channel but will have multiple slave channels all similarly connected in the same manner as the illustrative slave channel shown in the diagram.

Referring now to the components of the master channel, a photodetector 14 is appropriately positioned to detect the products moving in the stream of products being sorted in the master channel. Such detection is well known in the art and is described somewhat in detail, for example, in U.S. Pat. No. 4,626,677. The output of the photodetector 14 is connected through a series of amplifier and other components 16 to produce a detector output 18 as one input to master channel comparator 20.

The other input to comparator 20 is a trip level value 22 derived from a sensitivity adjustment including a potentiometer 24 having a fixed voltage input. Hence, each time a detection is made of a non-standard (normally, a defective) product in the stream of products moving in the master channel, a detector output larger than the trip level value occurs, which results in an output from comparator 20 applied as an input to output pulse network 26. Network 26 produces a pulse output that is representative of the detection of one non-standard or defective product. This output is employed in the master channel to activate an automatic ejector so that the defective or non-standard products do not accumulate in the standard products sorted by the sorter.

A master channel counter 28 receives the output from output pulse network 26 and produces an output therefrom each time a predetermined number of pulses are produced from the output pulse network. The output from master channel counter 28 is output 30, which is applied to buss line 32. It may be seen that this connection is made via circuit board connection 34 in a manner well known in the art. Other similar circuit board connections are employed in the circuit, as shown.

Now referring to slave channel 12, many of the components which exist for the master channel also exist for the slave channel. For example, amplifiers 36 connected to a suitable detector 60 are substantially identical to amplifiers 16 and photodetector 14, respectively. Output 38 from these amplifiers is applied as the detector input to comparator 40. The other input to comparator 40 is different for the slave channel, however, than for the master channel previously described. This other input development is described fully below. The output of comparator 40 is applied to output pulse network 42, similar to output pulse network 26 for the master channel, which produces an pulse output representative of each non-standard product detected in the slave channel. Such pulse is used to produce an ejector operation for ejecting non-standard or rejected products from the slave channel.

Also, the output from pulse output network 42 is applied to a counter 44, similar to master counter 28. An output is produced from counter output 44 each time there is a predetermined number of rejection pulses from output pulse network 42, this number being set as the same number for the operation of counter 28. In the example illustrated this number is set at 128.

The output from counter 44 in the slave channel and from counter 28 in the master channel are both applied as respective inputs to up/down counter 46. There are a series of connections from up/down counter 46 to a multiplying digital-to-analog converter circuit or multiplier 48. In normal operation, master channel counter output 30 and slave channel counter output 50 from counter 44 arrive at up/down counter 46 almost simultaneously. However, one of these will always arrive slightly ahead of the other as more fully described below. Should master output 30 arrive ahead of slave output 50, the up/down counter is accordingly decremented, and the multiplying factor applied is accordingly decreased. Conversely, if the slave channel counter output 50 arrives before master channel counter output 30, the up/down counter is incremented, which increases the multiplying factor of multiplier 48.

The input applied to multiplier 48 is the distributed trip level value 22 following suitable amplification and application through an input resistor 52. The output is identified as adjusted trip level value 54 following suitable treatment by an amplifier and resistor output network 56. This multiplier and output network determines the incremental sensitivity of the adjusted trip level value applied to comparator 44 (in place of the distributed trip level value applied to comparator 20 in the master channel).

Figure 2:
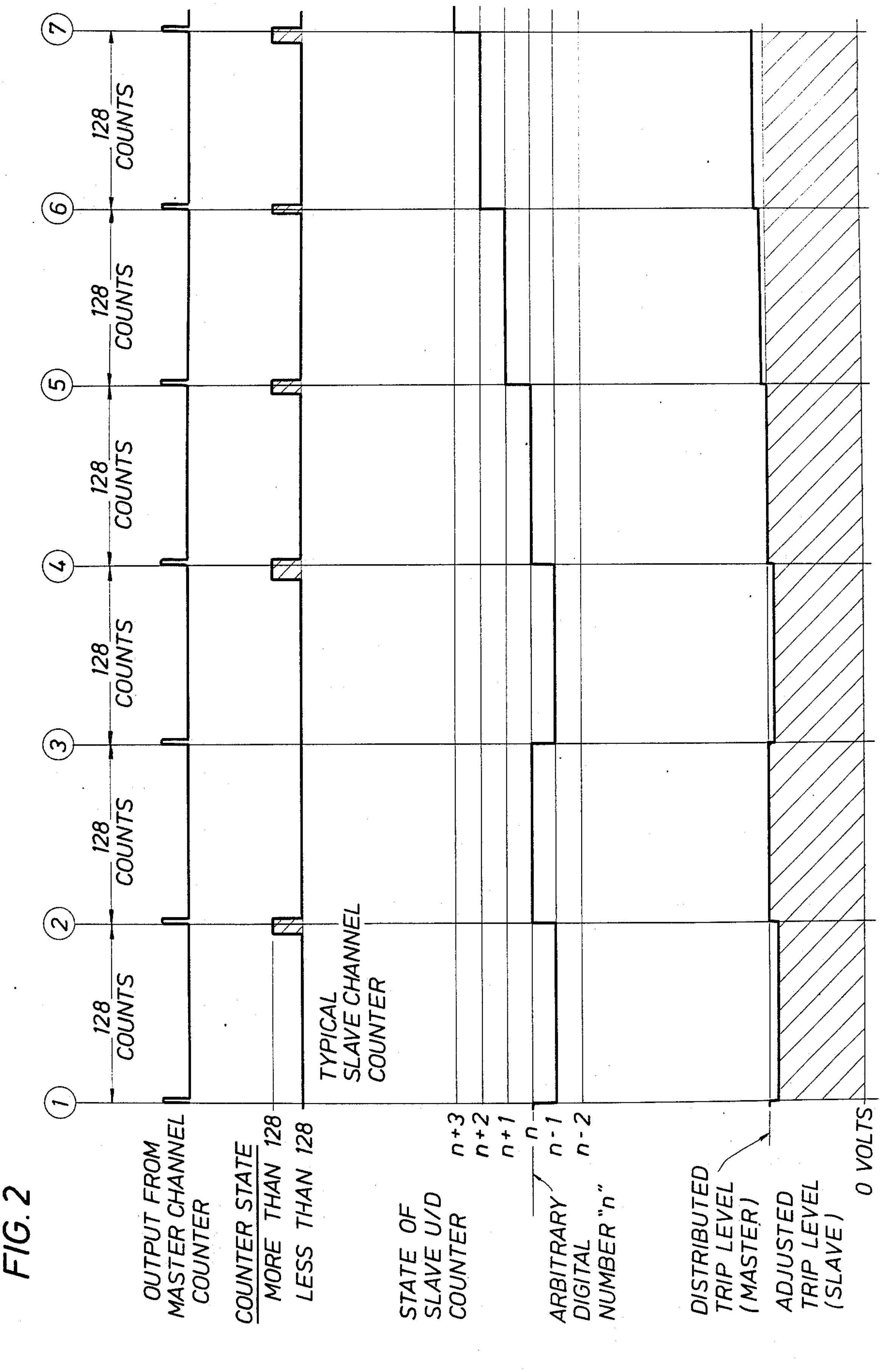
FIG. 2 is a time function diagram of the invention illustrated in FIG. 1.

The operation of the circuit can best be described by reference to FIG. 2, a time diagram of the occurrence in a typical operation of the master channel and slave channel portion. Shown in the diagram are four (4) waveforms. The top waveform is the output from the master channel counter. The second waveform is the output from a typical slave channel counter. The third waveform is the output from the up/down counter to the multiplier. The fourth waveform is a representation of the adjusted trip level value applied to comparator 40 of the slave channel. It will be seen by looking at the top waveform that there is an output from the master channel counter each time a 128 count from output pulse network 26 has occurred. The time distances between these occurrences (horizontal axis scale) represents exactly 128 counts, but are only approximately equal in time interval since 128 rejected products do not occur in exactly the same time, time after time.

The pulse width of the output from the master channel is the same each time it occurs since the reset time is determined by time constant circuit 29 that is connected to the output of counter and to the reset connection occurs at the same time interval distance from the pulse leading edge each time there is an output from master counter 28. It will be seen, however, that reset time constant circuit 58 connected to the input of the reset connection to slave counter 44 is activated by the output of master counter 28, not slave counter 44. Note that time constant 58 is 1/10 the value of time constant 29. This insures that the slave counter RESET pulse will be fully developed before pulse 30 is cancelled. The delay circuit 29 prevents a 'RACE' condition at the U/D counter 46. Again, however the distance between the pulses represents exactly 128 counts of the non-standard products occurring in the master channel. In the diagram, it will be seen that the predetermined number of slave counts have not yet occurred at time 1 when the master count occurs. Hence, at this point, the master channel puts out a pulse to cause the up/down counter to accordingly decrement. The slave up/down counter decreases from an arbitrary digital number "N" by a factor of 1, as shown by the third waveform on the diagram and, hence, sensitivity is increased. The adjusted trip level decreases toward zero volts from the distributed trip level, as shown the fourth waveform.

At point 2, the slave channel count has already reached a count of 128 when the master channel puts out its pulse. Hence, the up/down counter is incremented by the slave channel counter output, which increases the adjusted trip level. This has the effect of reducing the sensitivity of the slave channel so that it now rejects fewer defects than previously.

At the third point, the same conditions exist as existed at the first point. Hence, the adjusted trip level decreases towards zero volts to increase the sensitivity of the slave channel, causing the slave channel to reject more defects over the same period of time.

At time number 4 on the diagram, the adjusted trip level is adjusted in the same manner as at point number 2. It will be seen that the adjustment in the same manner is made at points 5, 6 and 7 since each time the slave counter occurs before the master counter. Each time this occurs the adjusted trip level is adjusted upward from the distributed trip level at which the master channel operates.

It will be seen that the operation is iterative. The performance of each slave channel is forced by the operation of the circuitry to track the performance of the master channel even though the degree of uniformity from channel to channel required for this performance may vary.

In a preferred embodiment of the sorter, the location of the master channel is typically selected somewhere near the center point of the channels located within the sorter, although the master channel can be any of these channel locations. Since circuit boards are typically used for components in the master channel and in the slave channels, the master channel can conveniently be located at the selection of the operator.

While a particular embodiment of the invention has been shown, it will be understood that the invention is not limited thereto. Many modifications may be made and will become apparent to those skilled in the art.

What is claimed is:

1. In a sorter of fungible products for removing non-standard products from standard ones having a plurality of channels from a pre-sorted mass of products to the sorted output through which move separate, substantially equal streams of products while being sorted, each channel including detection means for identifying non-standard products to be ejected and intermittently operated ejector means operated by said detection means in response to the detecting of a non-standard product, said detector means including sensitivity control means for determining the amount of deviation from standard that determines non-standard product detection, said sensitivity control means including a comparator having a first input indicative of a detected vaue of the products in the moving stream and a second input indicative of a trip level value of a non-standard product to be ejected, the improvement of an automatic ejector gate normalizer in which one of said channels is designated as the master channel and the other of said channels are designated as slave channels, comprising said master channel including a master channel comparator producing an output each time a distributed trip level value is exceeded in the process of detecting a non-standard product in said master channel, master channel output pulse means for producing a pulse each time there is a non-standard product output from said master channel comparator, a master channel counter for producing an output after a predetermined number of counts from said master channel output pulse means, each of said respective slave channels including a slave channel comparator producing an output each time an adjusted trip level value is exceeded in the process of detecting a non-standard product in said respective slave channel, a slave channel output pulse means for producing a pulse each time there is a non-standard product output from said respective slave channel comparator, a slave channel counter for producing an output after said predetermined number of counts from said respective slave channel output pulse means, an up/down counter connected to the output of said master channel counter and said respective slave channel counter for producing a down output when the output from said master channel counter arrives before the output from said slave channel counter and for producing an up output when the output from said slave channel counter arrives before the output from said master channel counter, and multiplying means for receiving the distributed trip level value and producing the adjusted trip level value to said slave channel comparator, said multiplying means multiplying the distributed trip level value by a factor determined by said up/down counter to produce said slave channel adjusted trip level value for adjusting said slave channel output pulse means so that said slave channel counter produces its next subsequent output in time closer to the time of the next expected output from said master channel counter.

2. An automatic ejector rate normalizer in accordance with claim 1, and including adjustable means for setting said distributed trip level value.

3. An automatic ejector rate normalizer in accordance with claim 1, and including a master time delay circuit connected to the output of said master channel counter for resetting said master channel counter.

4. An automatic ejector rate normalizer in accordance with claim 3, and including a slave time delay circuit connected to the output of said master channel counter for resetting said slave channel counter.

5. An automatic ejector rate normalizer in accordance with claim 1, wherein said master channel counter products an output when said predetermined number of counts from said master channel output pulse means is 128 and said slave channel counter produces an output when said predetermined number of counts from said slave channel output pulse means is 128.

6. An automatic ejector rate normalizer in accordance with claim 1, wherein said multiplying means includes a digital-to-analog converter and said up/-down counter produces a digital input correction input to said multiplying means.

* * * * *